United States Patent [19]

White et al.

[11] 4,018,303
[45] Apr. 19, 1977

[54] OIL MIST LUBRICATOR FOR METAL TAPE

[75] Inventors: James Richard White, Everett; George Herbert Dodge, Kirkland; Jack Rose, Bellevue, all of Wash.

[73] Assignee: Sundstrand Data Control, Inc., Redmond, Wash.

[22] Filed: Jan. 27, 1975

[21] Appl. No.: 544,487

[52] U.S. Cl. .............................. 184/6.26; 184/15 R
[51] Int. Cl.² .................................... F01M 1/00
[58] Field of Search ............ 184/15 R, 6.26, 11 R, 184/13 R, 103 R, 14, 15 B; 118/320, 325, 326; 427/127, 424; 134/122, 182

[56] References Cited

UNITED STATES PATENTS

| | | | |
|---|---|---|---|
| 3,077,859 | 2/1963 | Cook | 118/326 |
| 3,739,746 | 6/1973 | Kodis | 118/326 |
| 3,746,129 | 7/1973 | Knapp | 184/6.26 |
| 3,842,798 | 10/1974 | Gerlovich | 118/326 |

Primary Examiner—Samuel W. Engle
Assistant Examiner—S. A. Cangialosi
Attorney, Agent, or Firm—Wegner, Stellman, McCord, Wiles & Wood

[57] ABSTRACT

In a recording tape lubricating apparatus, a tape is passed through a plenum chamber having a baffling hood therein which substantially encircles a portion of the length of said tape as a mist of oil is directed toward the underside of said tape under said hood. A film of oil is deposited on the underside of said tape with the surplus mist, in part, condensing on the inside of the hood and dropping to the floor of the plenum chamber where both the condensed oil and the balance of the surplus mist is evacuated to prevent escape into the surrounding facilities.

6 Claims, 4 Drawing Figures

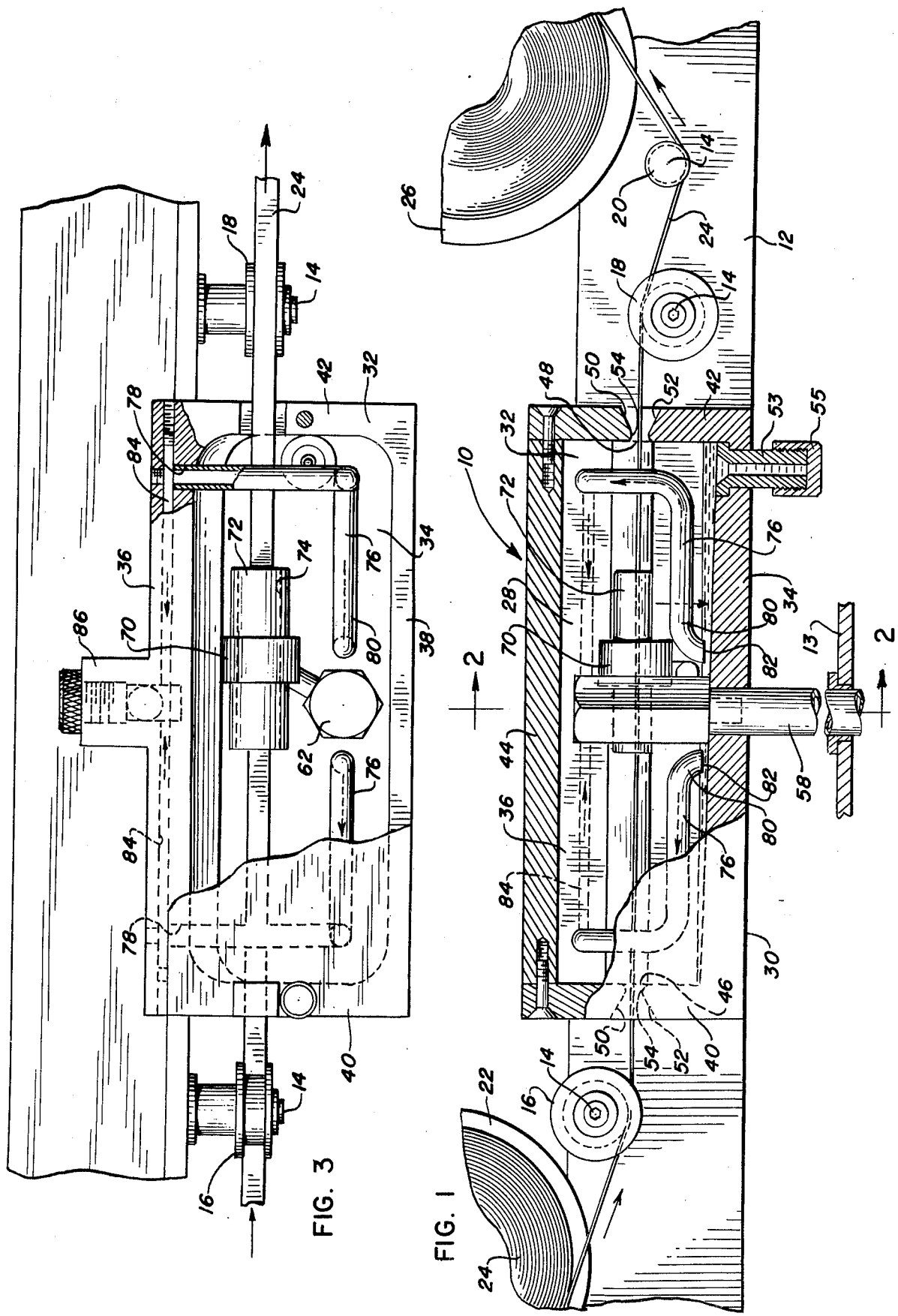

OIL MIST LUBRICATOR FOR METAL TAPE

BACKGROUND OF THE INVENTION

1. Field of the Invention

This invention relates to the manufacture of recording tape and, more particularly, to apparatus for applying a coating of a lubricating fluid, such as oil, onto a metallic magnetic recording tape.

2. Description of the Prior Art

In the successful operation of a recording instrument, such as a flight recorder used on aircraft to monitor certain critical operating parameters of the operation of the aircraft, it has been found that metallic magnetic recording tape must have a very low coefficient of friction with the magnetic recording heads. The only known way to reduce the coefficient of friction is by having an extremely thin film of lubricant, typically less than ten micro inches, on the recording surfaces of the tape. The signal transduction efficiency varies as the inverse of the "tape-to-head" spacing.

In the past, a film of lubricant was put on metallic tape by mixing the lubricant in a volatile solution, and the mixture was applied to the tape. The solution evaporated leaving the lubricant on the tape. This method was unsuccessful due to the uncontrollability of the volatile solution which resulted in poor control of the film thickness. Another method which has been utilized for applying a coating or film of lubricant to a surface, such as a tape, involves a wick-fed bar in a position such that the tape would be drawn over the bar picking up lubricant from the bar. This method was also not acceptable due to the poor control of the film thickness.

SUMMARY OF THE INVENTION

A plenum chamber is provided with a pair of aligned openings through which a magnetic tape passes as it enters and leaves the chamber. An oil mist generator is piped to a nozzle in the plenum chamber for blowing a fog of oil mist into a baffle hood surrounding a stretch of said tape. A film of lubricant is deposited on the underside of said tape such that, as the tape exits the plenum chamber and winds onto a take-up reel, the film of oil on one side of the tape will be transferred to the other side of the tape on the take-up reel.

An evacuation system is provided for the plenum chamber for evacuating the oil mist and the condensate not deposited on the tape.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a tape lubricating apparatus with parts broken away and in section;

FIG. 3 is a top plan view of the apparatus of FIG. 1 with parts broken away and in section.

DESCRIPTION OF THE PREFERRED EMBODIMENT

Figure 4:
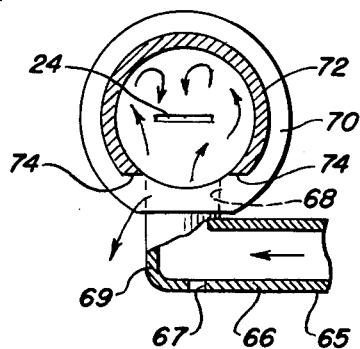
FIG. 4 is an enlarged cross-sectional view of the oil mist nozzle and baffle hood structure showing the flow of oil mist onto the bottom of the tape.

Referring to the drawings and, at the outset, to FIG. 1, a tape lubricating apparatus 10 is shown and has a base 12 supported above a platform 13. Three outwardly extending spindles 14 are mounted on base 12 for rotatably supporting the guide pulleys 16, 18 and 20. A play-out reel 22 is mounted on the base and has a long stretch of metallic recording tape 24 wound thereon. A brake (not shown) is carried by the base and acts on the reel 22 to add resistance to the turning of the reel 22. A take-up reel 26 is likewise mounted on the base in spaced relationship to the play-out reel 22 and is driven by a motor (not shown). The tape 24 from reel 22 passes around pulley 16 through a plenum chamber 28 in a lubricant applying housing 30, around the pulleys 18 and 20 and onto the take-up reel 26. The brake on the play-out reel 22 is set so as to control the tension on the tape 24 as it is drawn through the lubricating apparatus and wound onto the reel 26.

The housing 30 is supported on the base 12 and is comprised of a rectangular box-shaped portion 32 having a bottom 34, two side walls 36,38 and two end walls 40,42. A cover 44 is secured by means of bolts, or the like, to the portion 32 so as to define the plenum chamber 28 therewithin. The end walls 40,42 have aligned rectangular openings 46,48, respectively, with the top and bottom walls 50,52 of each opening being tapered so as to define a fairly narrow throat or venturi 54. The bottom wall 34 is sloped toward the right, as viewed in FIG. 1, with a short piece of pipe 53 extending downwardly therefrom. A threaded cap 55 closes the lower end of the pipe 53. The sloped bottom and pipe 53 will serve as a trap to catch heavy foreign particles, such as metal filings, that might get into the plenum chamber. The trap can be cleaned out by removing the cap 55.

Figure 2:
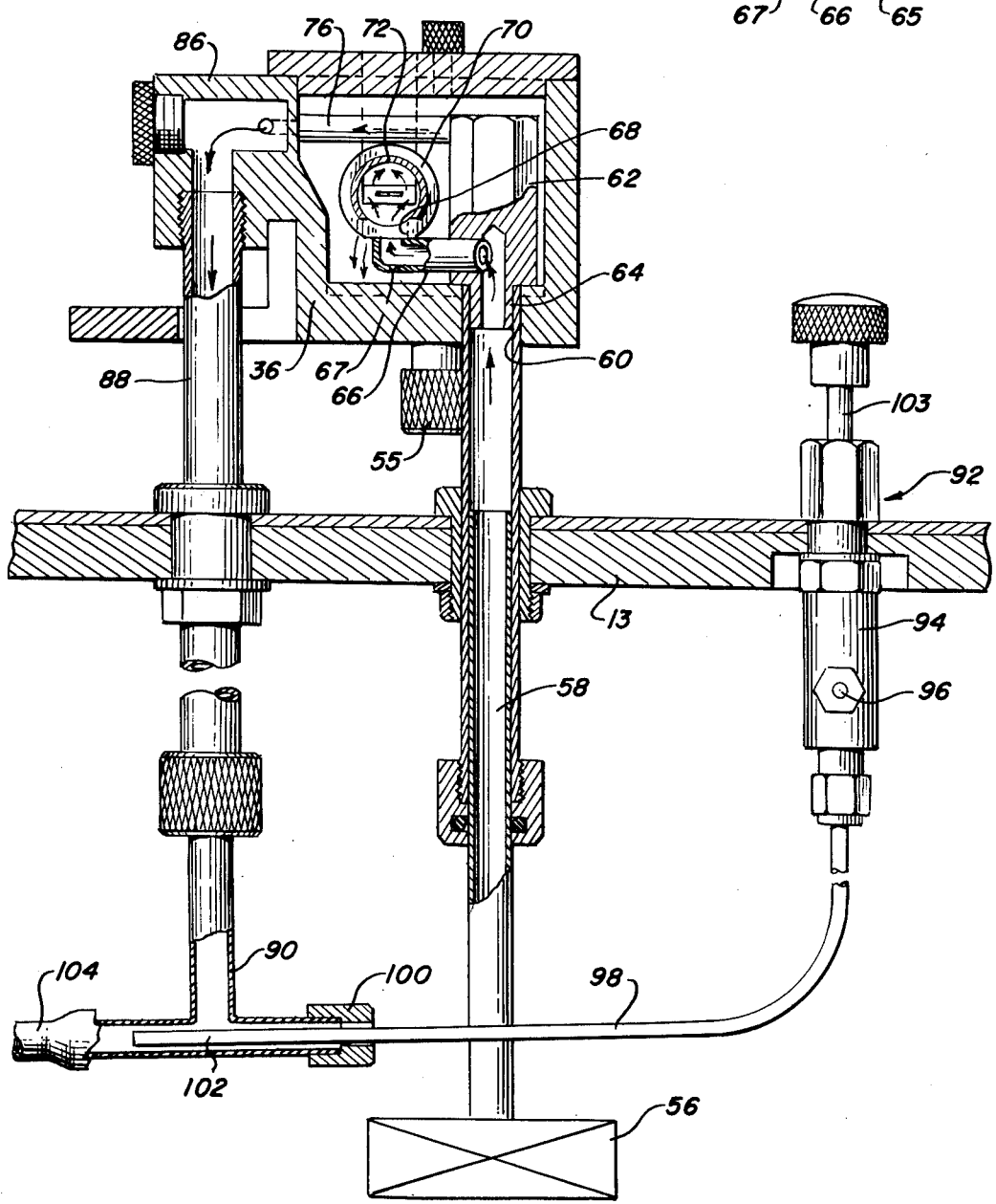
FIG. 2 is a cross-sectional view taken along the lines 2—2 of FIG. 1.

Connected to an oil mist generator 56, shown schematically in FIG. 2, is a pipe 58 which is threaded into an opening 60 in the bottom wall 34 of the housing. A fitting 62 has a nipple 64 secured in the opening 60 with an L-shaped sleeve 66 seated in the side of said fitting 62 so that oil mist from the generator 56 traverses the pipe 58, fitting 62 and sleeve 66. The long leg 65 of the sleeve 66 has a vent opening 67 in alignment with the short leg 69 of the sleeve. The short leg of the sleeve 66 is seated in an opening 68 in the support collar 70. A baffle hood 72 is fastened inside the collar 70 at the midportion of the hood. The hood 72 is cylindrical in cross section and has an elongate slot 74 (see FIG. 4) cut out of the lower portion thereof so that the hood forms an encircling structure open at each end and at the bottom. The oil mist traverses the sleeve 66 and issues from the end of the short leg 69 in the opening 68 acting as a nozzle directing the mist into the hood.

The tape 24 enters the plenum chamber 28 in the housing 30 through the venturi opening 46 and is directed through the center of the elongate hood 72, over the end of the leg 69 in the opening 68 and out of the housing 30 through venturi opening 48. The oil mist is forced into the encircling structure of the hood and strikes the undersurface of the tape 24, depositing a controlled film of oil onto said undersurface of the tape. The oil mist, in striking the tape, will spread out and will be deflected around the inside of the hood. Some of the oil mist will condense onto the inner surface of the hood and will run down and form drops on the edge of the slot 74, which drops will fall to the bottom wall of the chamber. The oil mist that does not form a film on the tape and does not condense on the surface of the hood will spill out of the open ends of the hood into the plenum chamber where it will be captured and returned to a reservoir as will be described hereinafter.

Within the housing 30, there is mounted two shaped suction tubes 76, each one of which is seated at one end in an opening 78 in the side wall 36. The tubes 76 are shaped and supported in the plenum chamber in such a way as to not interfere with the path of travel of the tape. The opposite end portion 80 of each tube 76 is bent downwardly and is positioned with the edges of the opening 82 lying parallel to the bottom wall 34 and in closely spaced relationship thereto. The openings 82 at the ends of the tubes 76 are positioned near the midportion of the plenum chamber in close relationship not only to the fitting 62, but also to the open bottom of the hood 72. The side wall 36 has a bore or passage 84 communicating with both tubes 76, which passages 84 merge into a bored protruding portion 86 on the wall 36. Piping 88 (FIG. 2) connects the protruding portion 86 to a T-connection 90.

Mounted on the platform 13 is a valve 92 which has a body 94 in which is formed an air inlet 96. The valve body 94 is connected by tubing 98 through a seal 100 into the top of the T-connection 90. The end portion 102 of tube 98 extends beyond the leg of the T-connection and is positioned generally centrally of the top of the T-connection. A valve actuator 103 extends into the valve body to control the valve and therefore the amount of air admitted through opening 96, tube 98 and into the tubing 104 connected to the end of the top of the T-connection. The tubing 104 is connected to a vacuum source (not shown) which draws a vacuum in the plenum chamber 28 through the openings 82 in the ends of the tubes 76. The suction through the openings 82 in the chamber not only will draw up condensed oil from the bottom wall of the chamber, but also will draw the uncondensed oil mist from the chamber. Air will be drawn into the constricted venturi openings 46,48 and will sweep the mist with it as it is drawn into the openings 82. The constrictions 54 in the openings 46,48 will create a mild venturi effect on incoming air so that no mist will be likely to escape out said openings into the surrounding atmosphere.

To vary the amount of suction and to create return air in the vacuum system, the valve 92 can be opened to varying degrees permitting air to enter opening 96 and tube 98 and to create a venturi effect in the tube 104. As more air is permitted to enter valve 92, the vacuum in the plenum chamber will be reduced, and conversely, the less air admitted through valve 92, the greater will be the vacuum in the plenum chamber.

With the structure hereindescribed, it is possible to pass a band of material, such as a metallic magnetic recording tape, through a substantially closed chamber with the band passing through an open bottomed hood in the chamber. An oil mist is blown onto one of the surfaces of the band under the hood to deposit an even, controlled film of oil on said surface of the band. The remaining oil mist will either condense on the hood and drop to the bottom of the chamber, or will be drawn along with the condensed oil into a vacuum pickup system for returning the oil and mist to a reservoir for reuse.

The metal tape to be lubricated is typically a thin foil of vanadium-cobalt-iron alloy sold under the trademark "VICALLOY" by Arnold Engineering on the order of 0.250 inch width and 0.005 inch thickness. The tape is drawn from the supply to the take-up reel at a speed of about 20 feet per minute (4 inches per second) under tension of about 10 to 15 ounces.

The oil mist generator is a commercially available "Alemite" generator in which the oil mist particles may be varied in size to control the amount of oil applied to the tape. The oil is preferably an oil of the type commonly referred to as instrument oil commercially available from Windsor. It is preferably of relatively low viscosity and high purity. It is relatively stable to avoid rapid evaporation and gum deposits. The hood in the plenum chamber permits localized positive application of oil to the tape while permitting evacuation of the plenum chamber to collect waste and avoid discharge of mist to the atmosphere through the openings which permit tape ingress and egress.

While the lubricating apparatus is described in association with play out and take-up reels, it should be understood that in actual practice it is utilized in association with a system including mechanical deburring means and electrochemical polishing means, the former as shown and described in the copending application of Merlin E. Lough, Gene E. Mertz, Harold L. Springer and Lawrence H. White, Ser. No. 544,486, filed January 27, 1975, entitled "Apparatus And Method For Lapping The Edges Of A Metal Foil Tape", and the latter as shown and described in the copending application of George H. Dodge, Merlin E. Lough, Harold L. Springer and Lawrence H. White, Serial No. 544,485, filed Jan. 27, 1975, entitled "Electrochemical Tape Cleaning", both assigned to the assignee of this application, in an arrangement where the tape is led off the supply reel, through the electrochemical cleaning apparatus, then through the lubricating apparatus, and onto the take-up reel, The band of material will be wound onto a take-up reel 26 where the oil on the one surface will be spread to the other surface of the band. The ability to coat the one surface of the band with sufficient lubricant to spread adequately to the adjacent surface of the band is a function (1) of the oil particle size created by the oil mist generator, (2) of the speed of movement of the band through the lubricating chamber, and (3) of the tension on the band as it is wound onto the take-up reel.

We claim:

1. In a tape lubricating apparatus having a base, a housing having a plenum chamber therein, means for passing a stretch of tape through said plenum chamber, an oil mist generator carried by said base, nozzle means connected to said generator and having a discharge opening pointing toward one surface of said tape for directing oil mist onto said surface, hood means for substantially encircling said tape in the vicinity of said nozzle means, means for drawing off condensate and excess oil mist from said chamber to prevent contamination of the atmosphere surrounding the apparatus, and said last-named means has two tubes, each tube having an opening positioned close to the bottom wall of the chamber near the midportion of said bottom wall, and suction means connected to said tubes for drawing said condensate and mist.

2. A lubricating apparatus as claimed in claim 1 wherein said housing has aligned constricted openings at each end through which said stretch of tape passes, said openings in the housing forming venturis for preventing mist from escaping said chamber when said suction means is drawing condensate and mist from said chamber.

3. A lubricating apparatus as claimed in claim 2 wherein valve means are provided for controlling air drawn into said suction means whereby the amount of suction in the chamber is varied.

4. In a tape lubricating apparatus having a base, a housing having a plenum chamber therein, a playout reel and a take-up reel mounted on said base with a stretch of tape extending between said reels and passing through said plenum chamber with the plane of said tape extending horizontally, an oil mist generator carried by said base, nozzle means connected to said generator and having a discharge opening pointing upwardly toward the bottom surface of said tape, hood means encircling the top and the two sides of said tape in the vicinity of said nozzle means, and means in said chamber for drawing off condensate and mist to prevent contamination of the atmosphere surrounding the apparatus.

5. A lubricating apparatus as claimed in claim 4 wherein said last-named means comprises at least one tube having an opening close to the bottom wall of the chamber, and suction means connected to said tube for drawing condensate and mist from said chamber.

6. A lubricating apparatus as claimed in claim 5 wherein valve means are provided in said suction means for varying the degree of suction in said chamber.

* * * * *